(No Model.)
D. J. DAVIDSON & C. H. MICHAEL.
HAME ATTACHMENT.
No. 301,690. Patented July 8, 1884.
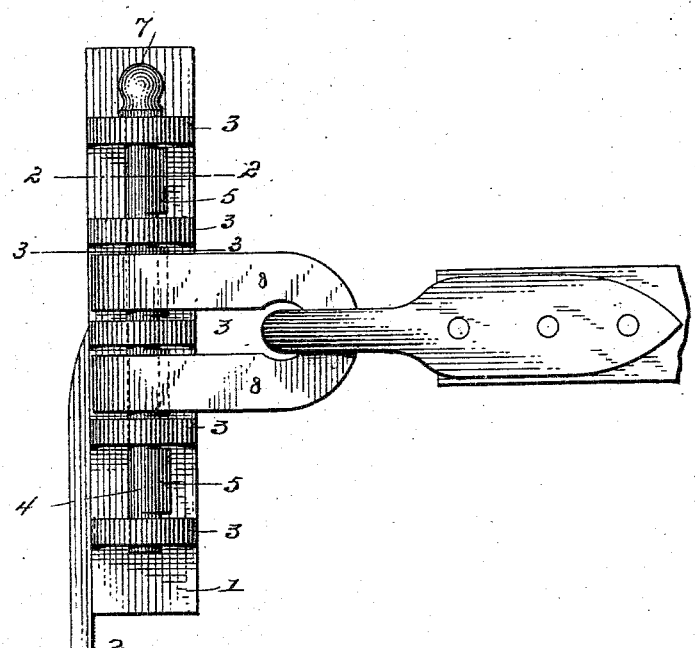
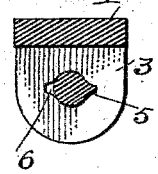
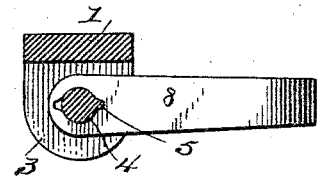

UNITED STATES PATENT OFFICE.

DANIEL J. DAVIDSON AND CHARLES H. MICHAEL, OF MARSHALL, ILLINOIS; SAID MICHAEL ASSIGNOR OF ONE-HALF OF HIS RIGHT TO SIMON JUMPER, OF SAME PLACE.

HAME ATTACHMENT.

SPECIFICATION forming part of Letters Patent No. 301,690, dated July 8, 1884.

Application filed March 7, 1884. (No model.)

*To all whom it may concern:*

Be it known that we, DANIEL J. DAVIDSON and CHARLES H. MICHAEL, both of Marshall, in the county of Clark and State of Illinois, have invented certain new and useful Improvements in Hame Attachments, of which the following is a specification.

Our invention relates to improvements on those devices employed for the connection of the tug-clip or trace-ring to the hame.

In our application for patent, (Serial No. 116,242) filed on the 2d day of January, 1884, we have shown an improved plate for attachment to the hame, such plate having lugs, between which the trace clip or clevis is vertically adjustable.

Our present invention consists, first, in an improved form of pin for connecting plate and trace-clevis, the pin being formed with ridges or projections passing through corresponding holes in the lugs of the plate and clevis, and retained to place by turning within its seat. The advantages of this construction are, its ready capacity for adjustment or removal, its great durability, and the impossibility of its being accidentally displaced, resulting from its locking into the trace-clevis, and its cheapness in cost over those pins which are screw-threaded to occupy corresponding screw-threaded lugs on the attaching-plate.

The second part of our invention consists in a peculiarly-formed piece, called by us herein a "clevis," for the connection of the trace tug or ring to the attaching or hame plate. This piece is made of U shape, with holes through both of its arms for the passage of the pin. These holes are of shape to receive the ridges or projections of the pin, so that when the clevis is held back under the strain of the trace the projections of the pin will be turned past their notches in the lugs of the attaching-plate, and the pin thus held from accidental removal. A clevis-formed connection of this sort is far superior to a hook, because of its much greater strength, of the distribution thereby of the strain more evenly over the whole length of the pin, and of its capacity of attachment to either leather-tug harness or trace-chain harness. The hook is of much greater cost, is adapted only for trace-chain harness, and is troublesome by reason of catching over everything that comes in its way, sometimes injuring seriously the animals and causing loss to the owner.

In order that our invention may be fully understood, we will proceed to describe it with reference to the accompanying drawings, in which—

Figure 1 is an elevation of our hame attachment, the clevis being in position for draft. Fig. 2 is a cross-sectional view on the line 2 2, Fig. 1. Fig. 3 is a similar view on the line 3 3, Fig. 1.

1 is the attaching-plate, fixed to the hame by rivets, screws, or otherwise, and preferably having integrally cast lug 2 for the breast-ring.

3 are lugs formed on plate 1 in vertical series, and having vertical holes or seats for a pin, 4. The pin 4 has ridges or projections 5 along one side, which pass through corresponding notches or recesses, 6, in the lugs when the pin is being inserted or removed. Between such ridges the pin is round so that when down to its seat it may be turned, and thus locked against upward motion. A head, 7, on the pin is provided for convenience of handling.

8 is the improved clevis-formed piece for the attachment of the trace tug or ring. Its two arms embrace the pin 4 above and below one of the lugs 3, the holes therethrough being made of shape to receive the rigid portion of the pin, so that when the clevis is turned into the position shown in Fig. 1 the pin will turn with it, and be thus locked in place so long as there is strain on the trace. The pin and clevis turning freely together, great flexibility is provided in the attachment, and wear on the harness thus avoided. The clevis clasping the pin above and below one of the lugs, it is obvious that strain on the pin will be evenly distributed, no matter what the position of adjustment of the clevis.

Having thus described our invention, what we claim as new therein, and desire to secure by Letters Patent, is—

1. The combination of a hame-plate having two or more lugs with vertical holes or seats, substantially of the form described, a pin having complementary lugs or projections at intervals, and a clevis or hook having similar holes, all of said parts being so arranged as to adapt the pin to be locked against vertical displacement by the turning of the clevis or hook to working position, in the manner hereinbefore described.

2. The combination, with the hame-plate having lugs 3 and pin 4, of the clevis-formed tug or loop for the attachment of the trace clip or ring, constructed substantially as set forth.

DANIEL J. DAVIDSON.
CHARLES H. MICHAEL.

Witnesses:
SILAS S. WHITEHEAD,
E. D. JONES.